Figure 1:
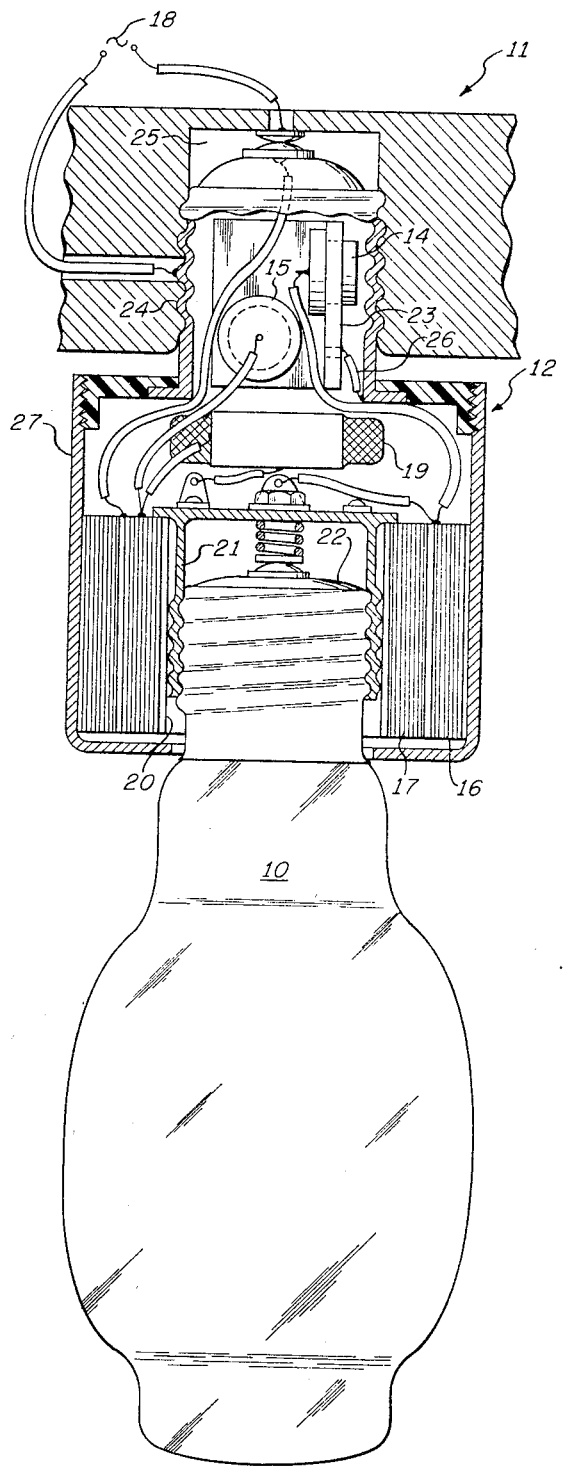

Sept. 27, 1966    K. I. MEYER ETAL    3,275,922
CONVERSION AND BALLAST UNIT
Filed Dec. 19, 1962

INVENTORS
KENNETH I. MEYER
EUGENE BECK
BY
ATTORNEY 3,275,922
CONVERSION AND BALLAST UNIT
Kenneth I. Meyer, Middlebury, and Eugene Beck, Roxbury, Conn., assignors to Sperry Rand Corporation, Great Neck, N.Y., a corporation of Delaware
Filed Dec. 19, 1962, Ser. No. 245,813
5 Claims. (Cl. 321—15)

This invention relates to apparatus for converting lighting fixtures whereby the output voltage therefrom is increased for starting purposes. It is particularly applicable for converting street lighting fixtures which were originally adapted for incandescent lamps to modern mercury vapor and other electric discharge lamps.

It is desirable to convert existing obsolete incandescent street lamp fixtures in residential areas to modern mercury vapor or other gaseous discharge lamps because these lamps provide a more efficient light source than incandescent lamps for street lighting purposes and they also enjoy a considerably longer service life.

Preferably, the conversion unit should be of the type that is readily installed by unskilled personel and should not require wiring changes within the street lighting fixture itself. However, gaseous discharge lamps require an initial starting voltage approximately twice that of the comparable incandescent street lamps. A further problem is posed in that the gaseous discharge lamp operating voltage is approximately one-half of its starting voltage and current limiting devices must also be incorporated in the unit. In addition, it is very important that the conversion unit be compact and light in weight.

It is a primary object of the present invention to provide a conversion unit for lighting fixtures to suitably increase and control the output voltage therefrom that is readily adapted to existing lighting fixtures and does not require internal wiring changes.

It is a further object of the present invention to provide apparatus for converting lighting fixtures from incandescent lamps to gaseous discharge lamps that is compact, simple to install, reliable in operation and relatively inexpensive.

It is a further object of the present invention to provide a gaseous discharge lamp including conversion apparatus in order that the gaseous discharge lamp may be installed in lighting fixtures originally adapted for incandescent lamps.

The above objects are accomplished by utilizing a voltage doubler circuit wherein the condensers thereof are coaxially disposed one within the other and have an aperture through the innermost condenser for receiving the gaseous discharge lamp. The conversion unit is made more compact by inserting the diodes of the voltage doubler circuit on a common heat sink element and then mounting this element within a hollow base that is adapted to be secured to the lighting fixture.

Figure 2:
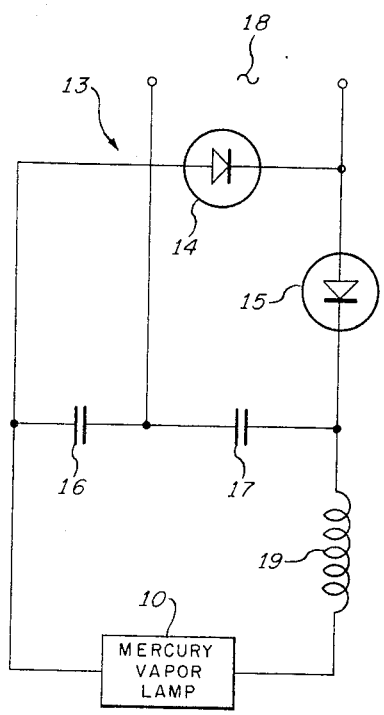

Referring to the drawings,

FIG. 1 is a sectional view of the conversion apparatus of the present invention, and FIG. 2 is a schematic wiring diagram of the voltage doubler circuit means shown in FIG. 1.

While the present invention will be described with respect to a mercury vapor lamp type of conversion kit, it will be appreciated that the invention is equally applicable to converting a fixture from one voltage to a voltage approximately twice its peak value by means of the invention disclosed herein without disturbing the internal wiring of the fixture.

Referring to FIG. 1, a mercury vapor lamp 10 is shown adapted to operate in a lighting fixture 11 originally adapted for incandescent lamps by means of the conversion unit 12 of the present invention. The voltage required to ignite a mercury vapor lamp such as 10 is approximately double that required by a comparable incandescent lamp and thus means must be provided to double the voltage provided by the incandescent lighting fixture 11. In the present invention a voltage doubler circuit means 13 as shown schematically in FIG. 2 is used. The voltage doubler circuit 13 includes a pair of silicon diodes 14 and 15 which are connected in series and a pair of condensers 16 and 17 connected to each other and to the silicon diodes 14 and 15 respectively. The common connection of the condensers 16 and 17 is adapted to be connected to an A.C. power source 18 associated with the lighting fixture 11. The voltage doubler circuit 13 further includes a current limiting reactor 19 to limit the mercury vapor lamp operating current in a well known manner. The voltage doubler circuit 13 provides voltage to the mercury vapor lamp 10 that is approximately double the peak of that provided by the 120 v., A.C. power source 18 thereby providing sufficient voltage to ignite the mercury vapor lamp 10. The regulation of the voltage doubling D.C. supply together with the current limiting reactor allows the voltage to build up from the low point after initially firing the lamp and to stabilize at the proper values of current and voltage as the lamp comes up to temperature and its normal operating condition.

As explained above, it is desirable that the voltage doubler circuit 13 be packaged in a small, compact, light weight unit that is readily adapted to be inserted in the existing lighting fixture 11. To provide this compact, light weight package, as shown in FIG. 1, the condensers 16 and 17 are hollow cylinders and coaxially arranged one within the other, and the innermost condenser 17 has a central coaxial aperture 20. The inside diameter of the condenser 17 which defines the aperture 20 is arranged to snugly receive a socket 21. The socket 21 in turn is adapted to receive the base 22 of the mercury vapor lamp 10.

To further conserve space, the silicon diodes 14 and 15 are of opposite polarities and thus it is possible to use their cases as a common connection and mount both diodes 14 and 15 on a common heat sink bracket assembly 23. The bracket assembly 23 with the diodes 14 and 15 thereon are in turn preferably arranged to fit within a hollow cylindrical base 24 of the conversion unit 12. The base 24 in turn is adapted to be received within the socket 25 of the lighting fixture 11.

A current limiting reactor 19 is disposed between the bracket assembly 23 and the coaxial condensers 16 and 17 in a manner to require the least space in the axial direction. With the exception of a jumper 26 connection from the bracket assembly 23 to the base 24, all the wiring is accomplished by using the self leads available on the components. A housing 27 encloses the voltage doubler circuit means 13 and provides a support for the base 24. Preferably, the components within the enclosure 27 are potted by means of an epoxy resin or other suitable potting compound.

Although the conversion unit 12 has been described as a separate unit, it will be appreciated that alternatively it may be manufactured integrally with the mercury vapor lamp 10. For example, the coaxial condensers 16 and 17 may be disposed in order that the centralized aperture 20 receives the neck of the mercury vapor lamp 10 and the base 24 may be the base of the combined conversion unit and mercury vapor lamp.

While the invention has been described in its preferred embodiments, it is to be understood that the words which have been used are words of description rather than limitation and that changes within the purview of the appended claims may be made without departing from the

What is claimed is:

1. A conversion unit for lighting fixtures for increasing the peak output voltage and controlling the current therefrom comprising,
   (1) voltage doubler circuit means having a pair of rectifying means and a pair of condensers connected to terminals adapted to be energized by an alternating current source for providing voltage doubling rectification,
   (2) said condensers being coaxially arranged one within the other, the innermost condenser having a coaxial aperture adapted to receive a socket,
   (3) said voltage doubler circuit means further including current limiting means,
   (4) a socket disposed within said aperture and adapted to receive a lamp,
   (5) a base adapted to be received in said lighting fixture,
   (6) said voltage doubling circuit means being connected to said base and said socket, and
   (7) a housing means for enclosing said circuit means and to which said base is attached.

2. A conversion unit of the character described in claim 1 wherein said pair of rectifying means are disposed within said base.

3. Apparatus for converting lighting fixtures from incandescent lamps to gaseous discharge lamps comprising,
   (1) voltage doubler circuit means having a pair of diodes and a pair of condensers connected to terminals adapted to be energized by an alternating current source for providing voltage doubling rectification,
   (2) said condensers being coaxially arranged one within the other, the innermost condenser having a coaxial aperture of a diameter adapted to snugly receive a socket,
   (3) a socket snugly fitted within said aperture and adapted to receive a gaseous discharge lamp,
   (4) a hollow base adapted to be received in said lighting fixture and within which said diodes are disposed,
   (5) said voltage doubling circuit means further including current limiting means,
   (6) said voltage doubling circuit means being connected to said base and said socket, and
   (7) a housing means for enclosing said circuit means and to which said base is attached.

4. Apparatus of the character described in claim 3 in which said pair of diodes are of opposite polarities and mounted on a common heat sink bracket, said diodes and bracket being disposed within said hollow base.

5. A gaseous discharge lamp and conversion apparatus for permitting said lamp to be used in a lighting fixture normally adapted for incandescent lamps comprising,
   (1) voltage doubler circuit means having a pair of diodes and a pair of condensers connected to terminals adapted to be energized by an alternating current source for providing voltage doubling rectification,
   (2) said condensers being coaxially disposed one within the other, the innermost condenser having a centralized aperture adapted to receive said lamp,
   (3) said voltage doubler circuit means further including current limiting means,
   (4) a hollow base adapted to be received in said lighting fixture,
   (5) said voltage doubling circuit means being connected to said base and said lamp, and
   (6) means for enclosing said circuit means and supporting said base.

References Cited by the Examiner

UNITED STATES PATENTS

| | | | |
|---|---|---|---|
| 2,483,815 | 10/1949 | Easton | 336—105 |
| 2,985,812 | 5/1961 | Peterson | 321—15 |
| 3,062,986 | 11/1962 | Fritz et al. | 315—200.1 |
| 3,121,835 | 2/1964 | Diebold | 321—15 |

OTHER REFERENCES

"A New Voltage Quadrupler," by William W. Garstang, published in February 1932, Electronics, Fig. 1; pages 50–51.

JOHN F. COUCH, *Primary Examiner.*

LLOYD McCOLLUM, *Examiner.*

J. M. THOMSON, M. L. WACHTELL,
*Assistant Examiners.*